United States Patent [19]

Watanabe et al.

[11] Patent Number: 4,770,812

[45] Date of Patent: Sep. 13, 1988

[54] PROCESS FOR PREPARING COLLOIDAL SOLS OF ANTIMONY PENTOXIDE IN ORGANIC SOLVENTS

[75] Inventors: Yoshitane Watanabe, Tokyo; Keitaro Suzuki; Masayuki Teranishi, both of Funabashi, all of Japan

[73] Assignee: Nissan Chemical Industries, Ltd., Tokyo, Japan

[21] Appl. No.: 934,401

[22] Filed: Nov. 24, 1986

[30] Foreign Application Priority Data

Nov. 28, 1985 [JP] Japan .................. 60-267965

[51] Int. Cl.$^4$ .................. B01J 13/00; C09K 2/10
[52] U.S. Cl. .................. 252/309; 252/610; 252/314
[58] Field of Search .............. 252/184, 309, 610, 314; 106/18.28, 287.18

[56] References Cited

U.S. PATENT DOCUMENTS

| | | | |
|---|---|---|---|
| 3,657,179 | 4/1972 | Yates | 106/18.27 X |
| 3,994,825 | 11/1976 | Crompton et al. | 252/309 |
| 4,017,418 | 4/1977 | Crompton et al. | 106/18.27 X |
| 4,026,819 | 5/1977 | Langere et al. | 252/369 X |
| 4,028,266 | 6/1977 | Langere et al. | 252/309 X |
| 4,051,069 | 9/1977 | Crompton et al. | 252/309 |
| 4,059,540 | 11/1977 | Crompton et al. | 252/309 |
| 4,110,247 | 8/1978 | Gower, II et al. | 252/313.1 |
| 4,348,301 | 9/1982 | Crompton et al. | 252/313.1 |
| 4,576,921 | 3/1986 | Lane | 252/313.1 X |
| 4,589,997 | 5/1986 | Watanabe et al. | 106/18.28 X |

FOREIGN PATENT DOCUMENTS

| | | | |
|---|---|---|---|
| 41536 | 3/1985 | Japan | 252/309 |
| 161731 | 8/1985 | Japan | 252/309 |
| 161730 | 8/1985 | Japan | 252/309 |
| 161729 | 8/1985 | Japan | 252/309 |

*Primary Examiner*—Matthew A. Thexton
*Attorney, Agent, or Firm*—Frishauf, Holtz, Goodman & Woodward

[57] ABSTRACT

There is disclosed a process for preparing colloidal sols of antimony pentoxide in organic solvents which comprises the steps of:

(a) reacting an alkali antimonate with 0.5 to 5 times of a monovalent or divalent inorganic acid in terms of stoichiometric ratio to form an antimony pentoxide gel, (b) after separating and washing the gel, aging the resulting wet cake at room temperature to 100° C., and (c) peptizing the product in an organic solvent with $Sb_2O_5$ being added, in terms of % by weight, 2 to 30% of an organic base and 0.2 to 20% of an organic acid as peptizing auxiliaries, and then removing water contained therein.

13 Claims, No Drawings

PROCESS FOR PREPARING COLLOIDAL SOLS OF ANTIMONY PENTOXIDE IN ORGANIC SOLVENTS

BACKGROUND OF THE INVENTION

This invention relates to a process for preparing colloidal sols of antimony pentoxide in organic solvents (hereinafter referred to as "antimony pentoxide organosol"). More particularly, it relates to a novel process for preparing an antimony pentoxide organosol by obtaining an antimony pentoxide gel from an alkali antimonate and an inorganic acid, after aging this gel, adding an organic base and an organic acid in an organic solvent to peptize the gel, and then removing water contained therein.

The antimony pentoxide sol is used as an auxiliary of a flame retardant for plastics, fibers, etc.; as a microfiller for surface treatment for plastics, glasses, etc.; as an inorganic ion exchanger to remove a metallic ion; and the like.

At present, high concentration aqueous sol ($Sb_2O_5$ content of 30 to 50% by weight and pH of 4 to 8) stabilized with an organic base has generally been used. However, the aqueous sol is used only with water or a hydrophilic organic solvent such as N,N-dimethylformamide (hereinafter referred to as "DMF") and alcohols, whereby its use is greatly limited.

In recent years there has been an increased in the demand for flame retardant treatment including modification of resins. This demand is met by antimony pentoxide organosols formed in hydrophilic and hydrophobic organic solvents.

As the conventional processes for preparing the antimony pentoxide organosol, there have been known a method in which anhydrous antimony trioxide or antimony trichloride is added to nitric acid and after heating, α-hydroxycarboxylic acid is added thereto, then an organic solvent such as DMF is added thereto and water is removed by evaporation (U.S. Pat. No. 3,657,179); a method in which to a monovalent or divalent or more of alcohols to be represented by ethylene glycol is added to a hydrogen halide such as hydrogen chloride, hydrophilic organic solvent such as DMF and α-hydroxycarboxylic acid to disperse antimony trioxide, and then oxidizing it with an aqueous hydrogen peroxide solution (U.S. Pat. Nos. 4,051,064 and 4,017,418); a method in which antimony pentoxide sol, which was obtained by the method of oxidizing antimony trioxide with an aqueous hydrogen peroxide solution and stabilized with amine, is dried and pulverized, and then the powder is dispersed in an organic solvent such as DMF (U.S. Pat. No. 4,026,819); or a method for preparing an aqueous sol stabilized with a combination of alkanol amine and α-hydroxycarboxylic acid, and phosphoric acid, etc. (U.S. Pat. No. 4,348,301) wherein there is disclosed that the aqueous sol obtained by this method is mutually soluble with a hydrophilic organic solvent (e.g., methanol, DMF, etc.).

The known method described above are generally limited to organic solvents which are very hydrophilic and mixible with water over wide ranges of concentration. Also, since the organoantimony pentoxides obtained by these methods contain extremely large amounts of α-hydroxycarboxylic acid (e.g., malic acid) or hydrohalogenic acid (hydrochloric acid), at flame resistant finish of the fibers, when it was added to the polymer for fibers, large possibilities such as lowering in physical properties of a polymer or corrosion of a recovery device due to particularly halogen at recovery of an organic solvent by evaporation after spinning are present.

An example of using a hydrophilic organic solvent antimony pentoxide organosol is for a flame resistant finishing of a polymer of acrylic fibers, or for microfillers in order to give a flame retardant property or increase a surface hardness to an alcohol solution of a silicone resin which has been used as a surface treatment for plastic films, glasses, etc.

In U.S. Pat. No. 4,348,301 as mentioned above, it is possible to prepare a hydrophilic organic solvent sol in combination of alkanol amine and α-hydroxycarboxylic acid, and phosphoric acid, etc., but it cannot be applied for a hydrophobic or non-aqueous organic solvent. Further, in U.S. Pat. No. 4,026,819, there is proposed a method in which an aqueous sol stabilized with an aliphatic amine, cyclic amine, etc. is prepared and dried, and the obtained powder is then dispersed in an organic solvent such as DMF to prepare an organosol. However, the organosol obtained by the method is unstable, and by this method, an organosol of a hydrophobic organic solvent such as toluene, etc. cannot be obtained.

In recent years, there are proposed methods in which antimony pentoxide is dispersed in a hydrophobic solvent by using a specific anionic surface active agent or nonionic surface active agent (Japanese Provisional Patent Publications Nos. 161729/1985, 161730/1985 and 161731/1985). However, according to these methods, since aggregation of particles are remarkable at a high concentration to form slurry or gel, it is difficult to obtain an antimony pentoxide organosol which is used a hydrophobic solvent with low viscosity and high concentration. Further, the product having high concentration obtained by the method has disadvantage that change in color will sometimes occur with a lapse of time.

SUMMARY OF THE INVENTION

The present inventors have already filed a process for preparing an aqueous antimony pentoxide sol by Japanese Provisional Patent Publication No. 41536/1985 which corresponds to U.S. Pat. No. 4,589,997 in which antimony pentoxide gel obtained by acid treatment of an alkali antimonate is separated and washed with water, and then peptized with an organic base. The present inventors have further made intensive studies on the removal of the above-mentioned conventional disadvantages and the preparation of antimony pentoxide organosol in a hydrophilic or hydrophobic solvents, which is stable and high concentration in order to satisfy the present demand, and as a result, they have accomplished the present invention.

That is, the present inventors have found that the intended antimony pentoxide organosol can be obtained by directly peptizing antimony pentoxide gel obtained by the acid treatment of an alkali antimonate with a small amount of peptizing agent without through an aqueous sol in a hydrophilic or hydrophobic organic solvent, and then removing water contained.

An object of the present invention is to provide a process for preparing stable and high-concentration antimony pentoxide organosol using a hydrophilic or hydrophobic organic solvent as dispersing medium with low cost.

The process for preparing an antimony pentoxide organosol of the present invention comprises the steps of:
(a) reacting an alkali antimonate with 0.5 to 5 times of a monovalent or divalent inorganic acid in terms of stoichiometric ratio to form an antimony pentoxide gel,
(b) after separating and washing the gel, aging the resulting wet cake at room temperature to 100° C., and
(c) peptizing the product in an organic solvent with $Sb_2O_5$ being added, in terms of % by weight, 2 to 30% of an organic base and 0.2 to 20% of an organic acid as peptizing agents, and then removing water contained therein.

DESCRIPTION OF THE PREFERRED EMBODIMENTS

The organic solvent used in the present invention can be divided into two types due to properties thereof, one of which is a hydrophilic organic solvent and the other is a hydrophobic organic solvent.

As the hydrophilic organic solvent, there may be mentioned, for example, acid amides represented by DMF, N,N'-dimethylacetamide and N-methyl-2-pyrrolidone; lower alcohols such as methanol, ethanol, etc.; polyvalent alcohols such as ethylene glycol, etc.; glycol ethers such as diethylene glycol monoethyl ether, etc.; cyclic ethers such as tetrahydrofuran, etc.; and others such as dimethylsulfoxide, etc.

As the hydrophobic organic solvent, there may be mentioned aromatic hydrocarbons represented by benzene, toluene, xylene, or solvent naphtha which mixtures of the above; aliphatic hydrocarbons or alicyclic hydrocarbons represented by hexane, kerosine and cyclohexane; esters represented by ethyl acetate and dioctylphthalate; halogenated hydrocarbons such as carbon tetrachloride, chloroform, trichloroethylene, chlorobenzene, etc.; ketones such as methyl ethyl ketone, etc.; and ethers such as diethyl ether, etc.

As the organic base to be used as one of the peptizing agent, there may be mentioned aralkyl amines such as benzylamine and phenethylamine; aliphatic amines such as propylamine, dibutylamine, n-octylamine and diethylenetriamine; alicyclic amines such as piperidine; alkanol amines such as monoethanolamine and triethanolamine; aromatic amines such as aniline, etc.; and these amines may be used in combination.

As the organic acid to be used as the another peptizing agent, alkylbenzenesulfonic acids or alkylnaphthalenesulfonic acids each having $C_1$ to $C_{15}$ alkyl group; alkylsulfonic acids, alkylsulfates and alkylpolyoxyethylenesulfates (ethyleneoxide added mole number: 1 to 5) each having $C_4$ to $C_{18}$ alkyl group; mono- or dialkylphosphates, mono- or diarylphosphates, alkylarylphosphates and polyoxyethylene adducts of the above phosphates (GAFAC, trade name, produced by Toho Kagaku Co., Ltd.); monocarboxylic acids having 3 to 12 carbon atoms; aliphatic dicarboxylic acids such as oxalic acid, malonic acid and maleic acid; hydroxycarboxylic acids such as lactic acid, tartaric acid, citric acid, gluconic acid and mandelic acid; aromatic carboxylic acids such as phthalic acid and trimellitic acid; and acids having sulfonyl group and carboxyl group in the structure such as sulfosalicylic acid and sulfosuccinic acid. These organic acids may be used in combination therewith.

The alkali antimonate to be used as the starting material of the present invention is represented by the formula:

$$M_2O \cdot Sb_2O_5 \cdot xH_2O$$

wherein M represents Na or K and x is an integer of 0 to 6, among these, sodium antimonate is preferred and sodium antimonate hydrate of $Na_2O \cdot Sb_2O_5 \cdot 6H_2O$ ($Sb_2O_5$: 64 to 65% by weight, $Na_2O$: 12 to 13% by weight and $H_2O$: 23 to 24% by weight) is particularly preferred.

The acid usable in this invention for the step of forming the antimony pentoxide gel by the reaction of alkali antimonate with the inorganic acid may include monovalent or divalent inorganic acids such as hydrochloric acid, sulfuric acid, nitric acid and sulfamic acid. Phosphoric acid, which has acid strength almost equal to antimonic acid, is unsuitable for obtaining the antimony pentoxide gels, and it becomes an aqueous phosphoric antimonate solution. Acids of weaker acid strength, such as formic acid, oxalic acid, etc., are also unsuitable for obtaining the desired antimony pentoxide gels.

In the reaction of an alkali antimonate with the above acid in this invention, it is possible to use the alkali antimonate in concentration of 2 to 40% by weight in terms of anhydrous antimony pentoxide ($Sb_2O_5$) in the reaction mixture. In case the concentration is less than 2% by weight, the amount of antimony pentoxide gels produced becomes too small to be desirable from economical viewpoint. In case it is in excess of 40% by weight, the solid portion in the reaction mixture reaches 60% or more and the reaction becomes heterogeneous. Preferable concentration ranges from 6 to 35% by weight as the anhydrous antimony pentoxide ($Sb_2O_5$).

In the reaction of alkali antimonate with the above acid according to this invention, concentration of the acid may be selected such that the stoichiometrical amount of acid/alkali antimonate ranges from 0.5 to 5, preferably from 1.0 to 3.5. Here, the stoichiometrical amount means, in case of the monovalent acid, the ratio of $[HX]/2[M_2O \cdot Sb_2O_5 \cdot xH_2O]$ (in the bracket is molar number) and in case of the divalent acid, the ratio of $[HX']/[M_2O \cdot Sb_2O_5 \cdot xH_2O]$. In case the stoichiometrical amount is less than 0.5, it is impossible to obtain the desired antimony pentoxide gels even if reaction temperature and concentration of alkali antimonate are elevated. In case it exceeds 5, the antimony pentoxide gels formed are peptized at the stage of water washing, whereby sols are washed away into a filtrate, and thus the productivity becomes inferior.

In the reaction of alkali antimonate with the above acid according to this invention, reaction temperature may range from room temperature to 100° C., and the reaction time available may range from 0.5 hour or more. In order to obtain antimony pentoxide organosols of small grain size, it is preferred to employ the reaction temperature not higher than 50° C. and the reaction time not longer than 10 hours.

The antimony pentoxide gels of this invention are highly aggregated owing to the acid and its salt with alkali metal present in the reaction system to form colloids of antimony pentoxide having particle sizes of 5 m$\mu$ to 20 m$\mu$, and immediately sedimented in the reaction mixture as aggregates having about 3 $\mu$m or larger. Accordingly, the gel slurry thus formed can be separated very easily by a pressure (or suction) filtration method, a centrifugal filtration method or the like.

After filtration, it becomes necessary to make washing in order to remove coexisting acid and its alkali metal salt. In washing, it is possible that there occurs partial peptization of antimony pentoxide gels. Therefore, in both the cases of the reduced pressure filtration and the centrifugal filtration, washing must be carried out immediately by pouring water in an amount of 0.5 to 4 times the amount of the reaction mixture.

Wet cake of antimony pentoxide gel obtained by the above filtration and washing has water content of 20 to 40 % by weight, and about a half thereof comprises water of crystallization. X-ray diffraction patterns of this antimony pentoxide gels are the same as those of the hydrate of antimony pentoxide ($Sb_2O_5 \cdot 4H_2O$), and X-ray diffraction patterns for the starting alkali antimonate are not observed. Also, there can be recognized a residue of alkali metal in this antimony pentoxide gels, and an amount of $M_2O/Sb_2O_5$ ranges, in terms of stoichiometric ratio, between 0.1 and 0.5.

Further, in the use of utilizing the metal absorptive activity of the antimony pentoxide, it is necessary to reduce the residual amount of alkali metal as little as possible. In this case, the $M_2O/Sb_2O_5$ ratio can easily be made, in terms of stoichiometric ratio, 0.005 to 0.1 by particularly at washing stage, pouring and washing 1 to 10 % by weight of the inorganic acid with 0.5 to 2 times water based on the amount of the reaction mixture and then pouring and washing with 0.5 to 4 times pure water or distilled water based on the amount of the reaction mixture. Also, if necessary, the $M_2O/Sb_2O_5$ ratio can be made in the range of 0.5 to 0.8 by adding an aqueous MOH solution to the antimony pentoxide gel slurry.

Further, if desired, the amount of absorbed water contained can be lowered or made almost zero by further washing the above wet cake after washing with water soluble alcohols so that the amount of water to be removed thereafter can be diminished.

Next, the wet cake thus prepared is effected the aging treatment. This aging must be carried out in the closed state or in the organic solvents.

This wet cake of the antimony pentoxide gel is aggregates of colloidal antimony pentoxide and much amount of water are absorbed on the surface thereof. This water inhibits the formation of bonding between the organic base and antimony pentoxide, that is, Sb—OH . . . $NH_2R$ mentioned hereinbelow. Accordingly, in order to effect the bonding sufficiently, it is necessary to reduce the amount of water on the surface of colloidal antimony pentoxide as little as possible. For carrying it, it is necessary to effect the aging treatment of the antimony pentoxide gels.

The aging temperature may range from room temperature to 100° C. and the aging time may range from 0.5 to 72 hours and preferably 60° to 90° C. and 1 to 10 hours.

The reason why the aging should be effected in the closed state is because when the aging is carried out in the open system in which the humidity is not controlled, evaporation of water occurs during aging so that the wet cake is partially dried, aggregates of colloidal antimony pentoxide become large and peptizing ratio is remarkably lowered and thus it is not preferred. The aging temperature may be 100° C. or higher, but it is not preferred since the cost will become high.

In case the organic solvent is the above mentioned hydrophobic organic solvent, it is preferred to effect the aging in the organic solvent, and in this case, aging becomes more effective by adding only the organic acid. After aging as mentioned by the above method, it is necessary to add the organic base and the organic acids as peptizing agents when the wet cake is dispersed in the organic solvent and peptized to form a gel slurry. The amount of the organic base is such that the ratio of the organic base/$Sb_2O_5$ ranges, in terms of % by weight, 2 to 30, preferably 3 to 20. The amount of the organic acid is such that the ratio of the organic acid/$Sb_2O_5$ ranges, in terms of % by weight, 0.2 to 20, preferably 0.5 to 18. In case in the range less than the above, the amount of unpeptized material becomes large. In case it exceeds the above range, while the peptization certainly occur, unpeptized material also remains and dispersibility of the antimony pentoxide sols becomes bad and thus it is not preferred.

Order to addition of these peptizing agents is not particularly limited, but it is preferred to add the organic acid firstly at aging in case of using the hydrophobic organic solvent.

In this invention, as the conditions of the peptization by using the aforesaid peptizing agents after aging of the wet cake, the temperature may range from room temperature to 150° C., preferably room temperature to 90° C. (if the boiling point of the solvent is 90° C. or lower, up to the boiling point). As the concentration of peptization, it is possible in the range of 2 to 50% by weight in terms of anhydrous antimony pentoxide ($Sb_2O_5$). In this concentration range, the antimony pentoxide organosol which is stable and relatively high concentration can be obtained. In case the concentration of peptization is less than 2% by weight, productivity is not good. In case it exceeds 50% by weight, while the peptization is possible, the concentration of the solid content will likely to become 60% by weight or more whereby the viscosity is high and the peptization tends to ununiform and thus it is not preferred. The time required for the peptization may be 0.2 to 10 hours.

Next, the processing steps after the above peptization will be explained. Since the present invention is the process of peptizing the wet cake of antimony pentoxide oxide gel by directly introducing in the organic solvent, it is required to remove the water contained in the organic solvent after peptization. In case the solvent is hydrophobic, the antimony pentoxide organosol and water can easily be separated since the antimony pentoxide organosol and water cause two phase separation at the same time with the peptization. On the other hand, in case of the hydrophilic organic solvent, since the mixture cannot be separated into two phases, the peptized sol can be obtained by removing water at ordinary pressure or under reduced pressure while heating.

The particle size of colloid of the antimony pentoxide organosol thus obtained is ranging from 5 to 20 mμ due to observation using an electron microscope.

EXAMPLES

This invention will be described below in more detail by referring Examples and Comparative examples, by which the present invention is not limited by them. In the following Examples and Comparative examples, "%" represents "% by weight" and sodium antimonates used have the composition of 64% $Sb_2O_5$, 12.5% $Na_2O$ and 23.5% $H_2O$.

EXAMPLE 1

(solvent naphtha sol)

In 13.3 kg of pure water was dispersed 5.31 kg of sodium antimonate, to which added with stirring was 3.84 kg of 35% hydrochloric acid. The mixture thus obtained was heated to 40° C. and reaction was carried out for 3 hours. Concentration of the antimony pentoxide in the reaction mixture was 15.4% calculated as $Sb_2O_5$ and stoichiometric ratio of hydrochloric acid/sodium antimonate was 1.73. Thereafter, slurry of antimony pentoxide gel formed by the reaction was subjected to suction filtration, and then washed with 15 kg of 7% hydrochloric acid and 16 kg of pure water. The wet cake of antimony pentoxide gel (5.64 kg) obtained had a composition of 63.8% $Sb_2O_5$, 0.38% $Na_2O$ and 35.82% $H_2O$; and $Na_2O/Sb_2O_5$ molar ratio of 0.03.

In 360 g of solvent naphtha was dispersed 340 g of the above wet cake of antimony pentoxide gel, to which added with stirring was 20.5 g of alkylbenzenesulfonic acid (Soft Osen-5S, trade name, produced by Nissan Chemical Industries, Ltd., hereinafter referred to as "ABS acid"). The mixture was heated to 100° C. and stirred for 30 minutes, 34.7 g of benzylamine was added to effect peptization. This mixture was separated into two phase with an upper portion of an aqueous layer and a lower portion of a solvent naphtha antimony pentoxide sol layer by standing. The solvent naphtha antimony pentoxide sol can easily be obtained by separating the lower portion of the sol layer without effecting any dehydration treatment. The resulting sol had a composition of 31% $Sb_2O_5$ and 3.1 % $H_2O$; specific gravity of 1.232; viscosity of 5.5 c.p.; and benzylamine/$Sb_2O_5$ (16.0%) and ABS acid/$Sb_2O_5$ (9.45%). Also, the peptization ratio was 98%, and this sol was stable after 1 month preservation at 50° C., particularly without causing any elevation of viscosity and gelation. Further, when the sol obtained was condensed to the $Sb_2O_5$ concentration of 45% by using an evaporator, the viscosity was 10 c.p. and particular increment in viscosity cannot be observed.

EXAMPLE 2

(solvent naphtha sol)

The wet cake of antimony pentoxide gel (340 g) obtained in Example 1 was dispersed in 356 g of solvent naphtha, to which added with stirring was 20.5 g of ABS acid used in Example 1. After the mixture was heated to 100° C. and stirred for 30 minutes, 21.1 g of n-octylamine and 17.5 g of benzylamine were added to the mixture and the mixture was stirred to effect peptization. The sol layer separated in the lower layer was separated in the same manner as in Example 1 to obtain solvent naphtha antimony pentoxide sol. This sol had a composition of 31% $Sb_2O_5$ and 3.0% $H_2O$; specific gravity of 1.238; viscosity of 5.5 c.p.; and (n-octylamine +benzylamine)/$Sb_2O_5$ (17.8%) and ABS acid/$Sb_2O_5$ (9.45%).

EXAMPLE 3

(kerosine sol)

The wet cake of antimony pentoxide gel (340 g) obtained in Example 1 was dispersed in 305 g of kerosine, to which added with stirring was 17.9 g of ABS acid. After the mixture was heated to 100° C. for 30 minutes, 5.42 g of n-propylamine and 17.9 g of benzylamine were added to the mixture to effect peptization. The aqueous layer was removed by separation in the same manner as in Example 1 to obtain kerosine antimony pentoxide sol. The kerosine antimony pentoxide sol obtained had a composition of 36% $Sb_2O_5$ and 2.0% $H_2O$; specific gravity of 1.230; viscosity of 7.0 c.p.; and (n-propylamine +benzylamine)/$Sb_2O_5$ (10.75%) and ABS acid/$Sb_2O_5$ (8.25%).

EXAMPLE 4

(xylene sol)

The wet cake of antimony pentoxide gel (340 g) obtained in Example 1 was dispersed in 356 g of xylene, to which added with stirring was 29.5 g of ABS acid. After the mixture was heated to 100° C. for 30 minutes, 27.3 g of diethylenetriamine was then added to the mixture to effect peptization. The aqueous layer was removed by separation in the same manner as in Example 1 to obtain xylene antimony pentoxide sol. The xylene antimony pentoxide sol obtained had a composition of 31% $Sb_2O_5$ and 3.0% $H_2O$; and diethylenetriamine/$Sb_2O_5$ (12.3%) and ABS acid/$Sb_2O_5$ (13.4%).

EXAMPLE 5

(DOP sol)

The wet cake of antimony pentoxide gel (201.9 g) obtained in Example 1 was dispersed in 213.3 g of dioctylphthalate (DOP), to which added with stirring was 9.0 g of ABS acid. After the mixture was heated to 90° C. for 30 minutes, 20.8 g of benzylamine was then added to the mixture to effect peptization. The aqueous layer was removed by separation in the same manner as in Example 1 to obtain DOP antimony pentoxide sol. The DOP antimony pentoxide sol obtained had a composition of 32.5% $Sb_2O_5$ and 2.0% $H_2O$; and benzylamine/$Sb_2O_5$ (16.1%) and ABS acid/$Sb_2O_5$ (6.99%).

EXAMPLE 6

(solvent naphtha sol)

The wet cake of antimony pentoxide gel (340 g) obtained in Example 1 was dispersed in 356 g of solvent naphtha, to which added with stirring was 20.5 g of GAFAC RE-410 (trade name, polyoxyethylenealkylphosphoate; produced by Toho Kagaku Co., Ltd.). After the mixture was heated to 100° C. and stirred for 30 minutes, 34.7 g of benzylamine was added to the mixture to effect peptization. The aqueous layer was removed by separation in the same manner as in Example 1 to obtain solvent naphtha antimony pentoxide sol. The solvent naphtha antimony pentoxide sol obtained had a composition of 31% $Sb_2O_5$ and 3.0% $H_2O$; specific gravity of 1.231; viscosity of 5.5 c.p.; and benzylamine/$Sb_2O_5$ (16.0%) and GAFAC/$Sb_2O_5$ (9.45 %).

EXAMPLE 7

(solvent naphtha sol)

The wet cake of antimony pentoxide gel (340 g) obtained in Example 1 was dispersed in 340 g of solvent naphtha, to which added with stirring was 20.5 g of ABS acid used in Example 1. After the mixture was heated to 100° C. and stirred for 30 minutes, 50 g of β-phenethylamine was added to the mixture to effect peptization. The aqueous layer was removed by separation in the same manner as in Example 1 to obtain solvent naphtha antimony pentoxide sol. The solvent naphtha antimony pentoxide sol obtained had a composition of 31% $Sb_2O_5$ and 3.0% $H_2O$; specific gravity of 1.234; viscosity of 5.6 c.p.; and β-phenethylamine/Sb$_2$O$_5$ (23.0%) and ABS acid/Sb$_2$O$_5$ (9.45 %).

EXAMPLE 8

(solvent naphtha sol)

The wet cake of antimony pentoxide gel (340 g) of Example 1 which had allowed to stand at the closed state at room temperature for 3 days was dispersed in 360 g of solvent naphtha, to which added with stirring were 34.7 g of benzylamine and then 20.5 g of ABS acid to effect peptization. After standing, the separated aqueous layer was removed by separation to obtain solvent naphtha antimony pentoxide sol. The solvent naphtha antimony pentoxide sol obtained had a composition of 31% Sb$_2$O$_5$ and 2.1% H$_2$O; specific gravity of 1.233; viscosity of 5.5 c.p.; and benzylamine/Sb$_2$O$_5$ (16.0%) and ABS acid/Sb$_2$O$_5$ (9.45 %).

EXAMPLE 9

(DMF sol)

In 1077.5 g of pure water was dispersed 1000 g of sodium antimonate, to which added with stirring was 522.5 g of 35% hydrochloric acid. Then, the mixture was heated to 30° C. and reacted for 3 hours. Concentration of the antimony pentoxide in the reaction mixture was 25% calculated as Sb$_2$O$_5$ and stoichiometric ratio of hydrochloric acid/sodium antimonate was 1.25. Then, slurry of antimony pentoxide gel formed by the reaction was subjected to suction filtration, and then washed with 1500 g of pure water. The wet cake of antimony pentoxide gel (1039 g) obtained (62.5% Sb$_2$O$_5$, 4.0% Na$_2$O and 33.5% H$_2$O; and Na$_2$O/Sb$_2$O$_5$ molar ratio of 0.334) was placed in a 2 l glass reactor and the wet cake product was heated to 80° C. and aged for 3 hours. Thereafter, 1500 g of DMF was added thereto and stirred to disperse, and 91.3 g of benzylamine was added thereto. After stirring for 30 minutes, 41.3 g of ABS acid was added thereto. The mixture was heated to 100° C. at ordinary pressure and water contained was removed therefrom to obtain DMF antimony pentoxide sol. The sol obtained had a composition of 30.5% Sb$_2$O$_5$ and 2.2% H$_2$O; specific gravity of 1.328; viscosity of 13 c.p.; and benzylamine/Sb$_2$O$_5$ (14.0%) and ABS acid/Sb$_2$O$_5$ (6.36%).

EXAMPLE 10

(DMAc sol)

The aged wet cake of antimony pentoxide gel (500 g, 63.7% Sb$_2$O$_5$, 4.2% Na$_2$O and 32.1% H$_2$O; and Na$_2$O/Sb$_2$O$_5$ molar ratio of 0.344) obtained by the same manner as in Example 9 was dispersed in 750 g of dimethylacetamide (DMAc), to which added with stirring were 45.0 g of benzylamine and 20.0 g of ABS acid. The mixture was heated to 80° C. and water contained was removed under reduced pressure to obtain DMAc antimony pentoxide sol. The sol obtained had a composition of 30.1% Sb$_2$O$_5$ and 1.9% H$_2$O; specific gravity of 1.300; viscosity of 130 c.p.; and benzylamine/Sb$_2$O$_5$ (14.1%) and ABS acid/Sb$_2$O$_5$ (6.28%).

EXAMPLE 11

(N-methyl-2-pyrrolidone sol)

The aged wet cake of antimony pentoxide gel (190.2 g, 63.7% Sb$_2$O$_5$, 4.2% Na$_2$O and 32.1% H$_2$O; and Na$_2$O/Sb$_2$O$_5$ molar ratio of 0.344) obtained by the same manner as in Example 9 was dispersed in 251.4 g of N-methyl-2-pyrrolidone, to which added with stirring were 18.0 g of benzylamine and 8.0 g of ABS acid. The mixture was heated to 80° C. and water contained was removed under reduced pressure to obtain N-methyl-2-pyrrolidone antimony pentoxide sol. The sol obtained had a composition of 30.0% Sb$_2$O$_5$ and 2.6 % H$_2$O; and benzylamine/Sb$_2$O$_5$ (14.8%) and ABS acid/Sb$_2$O$_5$ (6.60%).

EXAMPLE 12

(DMF sol)

The aged wet cake of antimony pentoxide gel (302.2 g. 63.7% Sb$_2$O$_5$, 4.2% Na$_2$O and 32.1% H$_2$O; and Na$_2$O/Sb$_2$O$_5$ molar ratio of 0.344) obtained by the same mananer as in Example 9 was dispersed in 582 g of DMF, to which added with stirring were 20.0 g of bensylamine and 37.0 g of toluenesulfonic acid monohydrate. The mixture was heated and water contained was removed under reduced pressure. The DMF sol obtained had a composition of 30.5% Sb$_2$O$_5$ and 3.5% H$_2$O; and benzylamine/Sb$_2$O$_5$ (10.4%) and toluenesulfonic acid/Sb$_2$O$_5$ (19.2%).

EXAMPLE 13

(DMF sol)

The aged wet cake of antimony pentoxide gel (320.5 g, 64.6% Sb$_2$O$_5$, 4.33% Na$_2$O and 31.07% H$_2$O; and Na$_2$O/Sb$_2$O$_5$ molar ratio of 0.35) obtained by the same manner as in Example 9 was dispersed in 630 g of DMF, to which added with stirring were 12.6 g of bensylamine and 3.3 g of oxalic acid dihydrate. The mixture was heated to 80° C. and water contained was removed under reduced pressure. The DMF sol obtained had a composition of 47.0% Sb$_2$O$_5$ and 2.0% H$_2$O; and benzylamine/Sb$_2$O$_5$ (6.09%) and oxalic acid/Sb$_2$O$_5$ (1.6%).

COMPARATIVE EXAMPLE 1

The wet cake of antimony pentoxide gel (340 g) of Example 1 was dispersed in 356 g of solvent naphtha, to which added with stirring was 34.7 g of benzylamine. While the mixture was heated to 100° C. and stirred for 1 hour, it did not peptize and solvent naphtha antimony pentoxide sol could not be obtained.

COMPARATIVE EXAMPLE 2

The wet cake of antimony pentoxide gel (340 g) of Example 1 was dispersed in 356 g of solvent naphtha, to which added with stirring was 20.5 g of ABS acid. While the mixture was heated to 100° C. and stirred for 1 hour, it did not peptize and solvent naphtha antimony pentoxide sol could not be obtained.

COMPARATIVE EXAMPLE 3

While the wet cake of antimony pentoxide gel (340 g) of Example 1 was dispersed in 356 g of solvent naphtha and the mixture was heated to 100° C. and stirred for 1 hour, it did not peptize and solvent naphtha antimony pentoxide sol could not be obtained.

COMPARATIVE EXAMPLE 4

After 300 g of aged wet cake of antimony pentoxide gel (63.7% Sb$_2$O$_5$, 4.2% Na$_2$O and 32.1% H$_2$O; and Na$_2$O/Sb$_2$O$_5$ molar ratio of 0.344) obtained by the same manner as in Example 4 was dispersed in 450 g of DMF, 2.7 g of benzylamine was added thereto. Then, water contained in the mixture was removed at 80° C. under reduced pressure, but the slurry remained as it was and sol could not be obtained.

COMPARATIVE EXAMPLE 5

After 300 g of the wet cake of Comparative example 4 was dispersed in 450 g of DMF, 12.0 g of ABS acid was added thereto and water contained therein was removed at 80° C. under reduced pressure, the slurry remained as it was and sol could not be obtained.

We claim:

1. A process for preparing colloidal sols of antimony pentoxide in organic solvents which comprises the steps of:
    (a) reacting an alkali antimonate with 0.5 to 5 times of a monovalent or divalent inorganic acid in terms of stoichiometric ratio to form an antimony pentoxide gel,
    (b) after separating and washing the gel, aging the resulting wet cake at room temperature to 100° C. for 0.5 to 72 hours, and
    (c) peptizing the dispersed gel product with 2 to 30% by weight of an organic base and 0.2 to 20% by weight of an organic acid, based on the amount of $Sb_2O_5$, as peptizing agents, and then removing water contained therein.

2. A process for preparing colloidal sols of antimony pentoxide in organic solvents according to claim 1, wherein said organic base is selected from the group consisting of aliphatic amines, alicyclic amines, aralkyl amines, aromatic amines and alkanol amines.

3. A process for preparing colloidal sols of antimony pentoxide in organic solvents according to claim 1, wherein said organic acid is selected from the group consisting of alkylbenzenesulfonic acids having $C_1$ to $C_{15}$ alkyl group; alkylnaphthalenesulfonic acids having $C_1$ to $C_{15}$ alkyl group; alkylsulfonic acids having $C_4$ to $C_{18}$ alkyl group; alkylsulfates having $C_4$ to $C_{18}$ alkyl group; alkylpolyoxyethylenesulfates having $C_4$ to $C_{18}$ alkyl group where ethyleneoxide added mole number thereof being 1 to 5; mono- or dialkylphosphates; mono- or diarylphosphates; alkylarylphosphates; polyoxyethylene adducts of the above phosphates; monocarboxylic acids having 3 to 12 carbon atoms; aliphatic dicarboxylic acids; hydroxycarboxylic acids; aromatic carboxylic acids; and acids having sulfonyl group and carboxyl group in the structure.

4. A process for preparing colloidal sols of antimony pentoxide in organic solvents according to claim 1, wherein said organic solvent is a hydrophilic organic solvents.

5. A process for preparing colloidal sols of antimony pentoxide in organic solvents according to claim 4, wherein said hydrophilic organic solvent is selected from the group consisting of acid amides, lower alcohols, polyvalent alcohols, glycol ethers, cyclic ethers and dimethylsulfoxide.

6. A process for preparing colloidal sols of antimony pentoxide in organic solvents according to claim 1, wherein said organic solvent is a hydrophobic organic solvents.

7. A process for preparing colloidal sols of antimony pentoxide in organic solvents according to claim 6, wherein said hydrophobic organic solvent is selected from the group consisting of aromatic hydrocarbons, aliphatic hydrocarbons, alicyclic hydrocarbons, esters, halogenated hydrocarbons, ketones and ethers.

8. The process of claim 1 wherein the aging is at 60° to 90° C. for 1 to 10 hours.

9. The process of claim 8 wherein 3 to 20% organic base is used.

10. The process of claim 9 wherein 0.5 to 18% organic acid is used.

11. The process of claim 1 wherein 3 to 20% organic base is used.

12. The process of claim 11 wherein 0.5 to 18% organic acid is used.

13. The process of claim 1 wherein the dispersed gel forms a dispersion contaning 2 to 50% by weight $Sb_2O_5$.

* * * * *